US007763337B2

(12) United States Patent
Paiva et al.

(10) Patent No.: US 7,763,337 B2
(45) Date of Patent: Jul. 27, 2010

(54) PROTECTIVE FILM ADHESIVE

(75) Inventors: Adriana Paiva, Woodbury, MN (US); Albert I. Everaerts, Oakdale, MN (US); Jeffrey D. Malmer, Mahtomedi, MN (US); Mark F. Ellis, St. Paul, MN (US); Duane D. Fansler, Dresser, WI (US); Kelly J. Gibbens, Vadnais Heights, MN (US)

(73) Assignee: 3M Innovative Properties Company, St. Paul, MN (US)

(*) Notice: Subject to any disclaimer, the term of this patent is extended or adjusted under 35 U.S.C. 154(b) by 465 days.

(21) Appl. No.: 11/576,962

(22) PCT Filed: Oct. 12, 2005

(86) PCT No.: PCT/US2005/036510

§ 371 (c)(1), (2), (4) Date: Apr. 10, 2007

(87) PCT Pub. No.: WO2006/044369

PCT Pub. Date: Oct. 27, 2006

(65) Prior Publication Data

US 2008/0095965 A1 Apr. 24, 2008

(51) Int. Cl.
*B32B 9/00* (2006.01)

(52) U.S. Cl. .................... 428/41.5; 428/40.1; 428/41.7; 428/343; 428/355 R; 428/355 AC

(58) Field of Classification Search ................ 428/40.1, 428/41.3, 41.5, 41.7, 343, 355 AC
See application file for complete search history.

(56) References Cited

U.S. PATENT DOCUMENTS

| | | | | |
|---|---|---|---|---|
| 24,906 A | | 7/1859 | Goodfellow | |
| RE24,906 E | * | 12/1960 | Ulrich | 526/328.5 |
| 3,578,622 A | | 5/1971 | Brown et al. | |
| 4,329,384 A | | 5/1982 | Vesley et al. | |
| 4,330,590 A | | 5/1982 | Vesley | |

(Continued)

FOREIGN PATENT DOCUMENTS

EP 0 419 020 3/1991

(Continued)

OTHER PUBLICATIONS

Cramm, R.H., and Bibee, D.V., "The Theory and Practice of Corona Treatment for Improving Adhesion", U.S. Defensive publication H 688, Oct. 1989, vol. 65, No. 8, pages 75-78.

(Continued)

*Primary Examiner*—David R Sample
*Assistant Examiner*—Walter Moore
(74) *Attorney, Agent, or Firm*—Jeffrey M. Olofson

(57) ABSTRACT

A protective floor film adhesive composition includes an acrylic pressure sensitive adhesive having an inherent viscosity in a range of 0.3 dl/g or greater, a cross-linker, and a plasticizer compatible with the acrylic pressure sensitive adhesive. The adhesive composition has a glass transition temperature of −10 degrees Celsius or less, and the adhesive composition has an initial 180 degree peel adhesion test value of 5 oz/in or greater and builds to a final 180 degree peel adhesion test value of 40 oz/in or less, and a haze test value of 10% or less. Protective floor film articles and methods of protecting flooring are also described.

41 Claims, 1 Drawing Sheet

100

140 120 110 130

U.S. PATENT DOCUMENTS 4,379,201 A 4/1983 Heilmann et al.
4,737,410 A * 4/1988 Kantner ...................... 428/343
4,737,599 A 4/1988 Fontaine
5,407,971 A 4/1995 Everaerts et al.
5,502,089 A 3/1996 Bricker et al.
5,506,279 A 4/1996 Babu et al.
5,800,919 A * 9/1998 Peacock et al. ....... 428/355 AC
5,861,211 A 1/1999 Thakkar et al.
6,280,557 B1 8/2001 Peloquin et al.
6,479,073 B1 * 11/2002 Lucast et al. ................ 424/448
6,720,387 B1 4/2004 Stark et al.
2004/0191459 A1 * 9/2004 Driesten .................... 428/42.2

FOREIGN PATENT DOCUMENTS

EP 1 234 839 A 8/2002
WO 97/031077 8/1997
WO 02/102912 12/2002
WO 03/020841 A 3/2003

OTHER PUBLICATIONS

Billmeyer, F.W., "Textbook of Polymer Science", Wiley-Interscience, Second Edition, pp. 84 and 85, 1971.

* cited by examiner

PROTECTIVE FILM ADHESIVE

BACKGROUND

The present invention relates generally to film adhesives. More particularly, the present invention relates to protective floor film adhesives.

Floor care programs today are primarily used to both protect and/or enhance the appearance of a floor substrate, such as vinyl, marble, terrazzo, ceramic, linoleum, wood, etc. floor substrates. Floor care programs can include many different types of products, but generally involve the use of a sealer and/or finish applied to the surface of the floor substrate. This finish can be maintained with the use of cleaners and tools, which can include various buffing or burnishing machines. Although these programs are effective, they are considered a large expense to customers. Additionally, if a surface becomes worn or unsatisfactory over time, it is necessary to entirely remove the floor substrate, to provide a new fresher look to the floor.

Polymer-based floor coatings are an example of finishes that are typically applied as an aqueous emulsion or solvent solution that dries to a hard film. After months of exposure to traffic, such finishes become scratched, scuffed and soiled to a point where they need to be completely removed from the floor and a new finish applied. The removal of these coatings from floors has traditionally required the use of chemical solutions, typically mixtures of alkalis and volatile solvents. These chemical mixtures can be generally unpleasant and messy to use. In addition, some highly cross-linked polymer-based floor coatings are difficult, if not impossible to remove by any means other than physical abrasion.

While pressure sensitive adhesives have been used in the past to apply a variety of films to substrates, pressure sensitive adhesives have not been described that enable the successful application of a protective film to a floor substrate, such that the protective film provides an immediate and clear application while also providing long-term removability and environmental stability to the film product.

SUMMARY

Generally, the present invention relates to film adhesives and more particularly, to protective floor film adhesives films incorporating such adhesives and methods of protecting flooring.

In one embodiment, protective floor film adhesive composition includes an acrylic pressure sensitive adhesive having an inherent viscosity in a range of 0.3 dl/g or greater, a cross-linker, and a plasticizer compatible with the acrylic pressure sensitive adhesive. The adhesive composition has a glass transition temperature of −10 degrees Celsius or less, and the adhesive composition has an initial 180 degree peel adhesion test value of 5 oz/in or greater and builds to a final 180 degree peel adhesion test value of 40 oz/in or less, and a haze test value of 10% or less.

In another embodiment, a protective floor film article includes a base floor film layer and an acrylic pressure sensitive adhesive layer disposed on the base floor film layer. The acrylic pressure sensitive adhesive includes an acrylic pressure sensitive adhesive having an inherent viscosity in a range of 0.3 dl/g or greater, a cross-linker, and a plasticizer compatible with the acrylic pressure sensitive adhesive. The adhesive composition has a glass transition temperature of −10 degrees Celsius or less and the adhesive composition has an initial 180 degree peel adhesion test value of 5 oz/in or greater and builds to a final 180 degree peel adhesion test value of 40 oz/in or less, and a haze test value of 10% or less.

In a further embodiment, a method of protecting flooring includes providing a protective floor film and laminating the protective floor film onto a floor surface. The protective floor film includes a base floor film layer and an acrylic pressure sensitive adhesive layer disposed on the base floor film layer. The acrylic pressure sensitive adhesive includes an acrylic pressure sensitive adhesive having an inherent viscosity in a range of 0.3 dl/g or greater, a cross-linker, and a plasticizer compatible with the acrylic pressure sensitive adhesive. The adhesive composition has a glass transition temperature of −10 degrees Celsius or less and the adhesive composition has an initial 180 degree peel adhesion test value of 5 oz/in or greater and builds to a final 180 degree peel adhesion test value of 40 oz/in or less, and a haze test value of 10% or less.

In another embodiment, a method of protecting flooring includes providing a protective floor film. The protective floor film includes a base floor film layer and an acrylic pressure sensitive adhesive layer disposed on the base floor film layer. The acrylic pressure sensitive adhesive includes an acrylic pressure sensitive adhesive with an inherent viscosity in a range of 0.3 dl/g or greater, a cross-linker, and a plasticizer compatible with the acrylic pressure sensitive adhesive. The adhesive composition has a glass transition temperature of −10 degrees Celsius or less and the adhesive composition has an initial 180 degree peel adhesion test value of 5 oz/in or greater, and a haze test value of 10% or less. The protective floor film is laminated onto a floor surface. Then the floor film is removed from the floor surface to form a removed protective floor film. After removal of the protective floor film, 10% or less of the protective floor film remains on the floor surface.

In still another embodiment, a method of protecting flooring includes providing a protective floor film. The protective floor film includes a base floor film layer and an acrylic pressure sensitive adhesive layer disposed on the base floor film layer. The acrylic pressure sensitive adhesive includes an acrylic pressure sensitive adhesive with an inherent viscosity in a range of 0.3 dl/g or greater, a cross-linker, and a plasticizer compatible with the acrylic pressure sensitive adhesive. The adhesive composition has a glass transition temperature of −10 degrees Celsius or less and the adhesive composition has an initial 180 degree peel adhesion test value of 5 oz/in or greater, and a haze test value of 10% or less. The protective floor film is laminated onto a floor surface at a rate of at least 0.5 meters per second. Then the floor film is removed from the floor surface to form a removed protective floor film.

The above summary of the present invention is not intended to describe each disclosed embodiment or every implementation of the present invention. The Figures, Detailed Description and Examples which follow more particularly exemplify these embodiments.

BRIEF DESCRIPTION OF THE DRAWINGS

The invention may be more completely understood in consideration of the following detailed description of various embodiments of the invention in connection with the accompanying drawings, in which.

Figure 1:
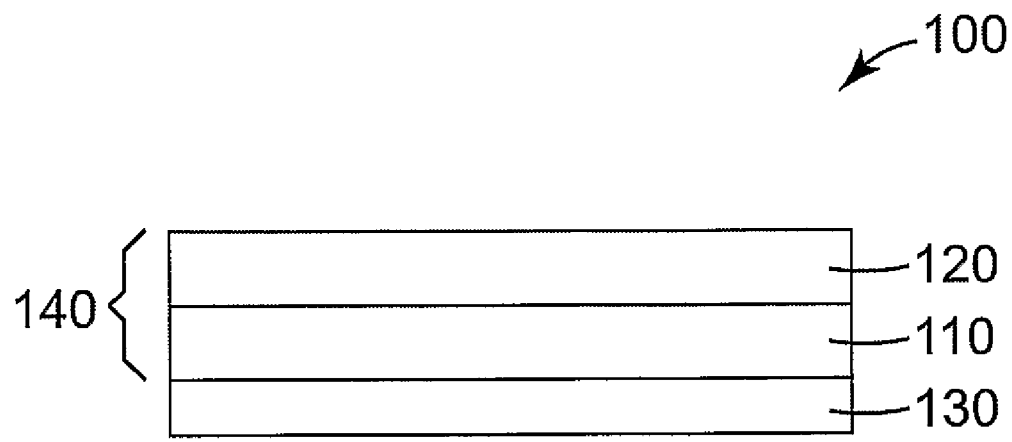
FIG. 1 is a schematic diagram of a protective floor film article.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

For the following defined terms, these definitions shall be applied, unless a different definition is given in the claims or elsewhere in this specification.

The term "polymer" will be understood to include polymers, copolymers (e.g., polymers formed using two or more different monomers), oligomers and combinations thereof, as well as polymers, oligomers, or copolymers that can be formed in a miscible blend.

The term "pressure-sensitive adhesive (PSA)" is well known to one of ordinary skill in the art to possess properties including the following: (1) aggressive and permanent tack, (2) adherence with no more than finger pressure, (3) sufficient ability to hold onto an adherend, and (4) sufficient cohesive strength to be removed cleanly from the adherend.

The recitation of numerical ranges by endpoints includes all numbers subsumed within that range (e.g. 1 to 5 includes 1, 1.5, 2, 2.75, 3, 3.80, 4, and 5).

As used in this specification and the appended claims, the singular forms "a", "an", and "the" include plural referents unless the content clearly dictates otherwise. Thus, for example, reference to a composition containing "a compound" includes a mixture of two or more compounds. As used in this specification and the appended claims, the term "or" is generally employed in its sense including "and/or" unless the content clearly dictates otherwise.

Unless otherwise indicated, all numbers expressing quantities of ingredients, measurement of properties such as contrast ratio and so forth used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings of the present invention. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviations found in their respective testing measurements.

The adhesive described herein can be used in conjunction with a protective film to provide temporary protection to a substrate such as, for example, a flooring substrate, or other substrate. In many applications, the appearance of the substrate needs to be maintained or enhanced (for example by adding gloss), requiring the total construction and its substrate laminated form to be defect-free, visually clear (e.g., posses a haze value of 10% or less) and non-discoloring. Since the adhesive is an integral part of the protective film construction and the applied product, some requirements on the adhesive are: optical clarity; non-yellowing upon aging; non-staining to the substrate; no adverse effect on the appearance of the substrate it protects; remains cleanly removable from the substrate over a variety of removal conditions (e.g., rate of removal, temperature, etc.,) after several months or years of contact (i.e, the adhesion cannot build excessively to a wide variety of substrates); and applies defect-free, which can require good wetting of the substrate.

In some applications the substrates may contain significant amounts of plasticizers (such as the vinyl composite floor tiles), which can migrate up to the adhesive or moisture, such as an application on tile attached to a concrete floor in a basement, where moisture breathes up from the concrete. These types of applications put additional requirements on the adhesive, which include: plasticizer resistance (or at least tolerance); and resistance to moisture and mildew.

In some embodiments, the protective film can be applied manually. In other embodiments, the protective film is applied to larger surfaces (like a floor) using a mechanical applicator operating at higher speeds of several hundreds or even thousands of inches per minute (i.e., walking speed). This poses an extra challenge to the adhesive, because the adhesive has to be chosen in such a way as to provide high compliance (so it remains tacky) over a wide range of frequencies of deformation (as we apply the protective film faster, the frequency of deformation increases and adhesive has less time to respond in order to wet out the substrate). Also, since the applicator device, such as a rubber roller, moves across the protective film faster at higher application speeds, the time to apply pressure is significantly shorter. Higher application pressure typically cannot compensate for this, and poor or incomplete wetting of the substrate will result if the adhesive rheology is not properly selected (i.e the adhesive behaves stiff at that speed). Since optical appearance and defect-free lamination are important in many applications, it is important that the adhesive allows for application under a range of rate conditions, with high rates (i.e., walking speed) posing the biggest challenge.

In addition to being applied at high rates, the removal of the adhesive can equally be done at very high rates, and as already indicated earlier, this needs to be done without leaving adhesive or film residue on the substrate the film protected. Thus, in some embodiments, additional requirements on the adhesive include: applicability (i.e. achieving good adherence) and clean removability over a wide range of speeds, with high rates being the most difficult; and high wettability and good optical appearance when applied at different rates, again with high rates posing the biggest challenge.

Finally, the exposed edges of the protective film need to securely attach the material to the substrate over the lifetime of the application. Not only does this exposed edge have to stand up to mechanical impact, like from shoes or wheels bumping into the edge, but it also has to resist contact with cleaning chemicals, spills, and water, which can cause the bond to weaken and the film construction to prematurely detach from the substrate. Also, in some applications, the substrates may not be perfectly flat or an overlap splice may need to be made to cover the whole substrate. This requires the adhesive to resist low angle and low peel rate detachment because, while attached, the film construction may impose a constant stress on the adhesive, something the adhesive has to resist or debonding will result. In addition to having to accommodate unevenness in the substrate, application of the film construction and its required steering may also cause the backing to elongate in some areas. Since most backings will have a tendency to try to recover from this elongation, the adhesive also has to resist this additional stress. Thus in some embodiments, additional requirements on the adhesive include: low angle and low rate peel resistance; good stress relaxation; resistance to cleaning agents, water, spills, and mechanical impact; and high adhesion to the upper layer of the protective film (e.g., wear layer or wear layer—for overlap splicing.) Thus, an adhesive formulation is described that overcomes the unique challenges described above.

FIG. 1 shows a schematic diagram of one exemplary embodiment of a protective floor film article 140 disposed on a substrate such as, a flooring substrate 130. The protective floor film article 140 can include a base floor film layer 120 and a pressure sensitive adhesive layer 110 disposed on the base floor film layer 120. The pressure sensitive adhesive layer 110 can be disposed on the flooring substrate 130 to form a protected flooring article 100.

The flooring substrate 130 can be formed from any suitable flooring material. A partial listing of flooring substrates 130 include, for example, vinyl, marble, terrazzo, ceramic, linoleum, wood, metal, plastic, rubber, concrete, stone, vinyl composite tile, asphalt, and glass.

Although the compositions and methods of the present invention may find use in laminating films to floors, the compositions and methods may also be used to laminate adhesive-backed films to other surfaces such as, e.g., sidewalks, driveways, parking lots, walls, countertops, flooring materials, dry-erase boards, roads, tabletops, whiteboards, windows, shelves, patios, ceilings, stairs, etc.

The flooring substrate 130 can optionally include one or more floor finishes (not shown) disposed between the flooring substrate 130 and the pressure sensitive layer 110. Floor finishes or floor polishes can include a polymer compositions used in their formulation. Commercially available floor finish compositions can be aqueous emulsion-based polymer compositions including one or more organic solvents, plasticizers, coating aides, anti-foaming agents, polymer emulsions, metal complexing agents, waxes, and the like. These floor finish compositions can be applied to a floor surface and then allowed to dry in air, normally at ambient temperature and humidity.

The base film layer 120 may be made from any material suitable for providing a protective layer on an underlying flooring substrate 130. An example of a suitable material for the base film layer 120 is a polymer. In some embodiments, the base film layer 120 includes a polymer. The base film layer 110 can include a transparent polymer. Examples of suitable polymer films include, but are not limited to, polypropylene films, polyacetal films, polyamide films, polyester films, polystyrene films, polyvinyl chloride films, polyvinylidene chloride films, polyurethane films, polyurea films, and the like. In one embodiment the polymer film includes a polyethylene terephthalate (PET). In another embodiment the polymer film includes an ionomeric polyolefin available under the tradename Surlyn™ (DuPont, Del.)

The thickness of the base film layer 120 can be any useful thickness. In some embodiments, the base film layer 120 has a thickness of 25 to 2500 micrometers or from 25 to 250 micrometers. In another embodiment, the base film layer 120 has a thickness of 25 to 125 micrometers. In another embodiment, the base film layer 120 has a thickness of 25 to 75 micrometers.

The pressure sensitive adhesive layer 110 can include, an acrylic pressure sensitive adhesive having an inherent viscosity in a range of 0.3 dl/g or greater or from 0.3 to 2.0 dl/g, a cross-linker, and a plasticizer compatible with the acrylic pressure sensitive adhesive. In some embodiments, the pressure sensitive adhesive layer 110 has a glass transition temperature of −10 degrees Celsius or less and a 180 degree peel adhesion test value in a range of 5 to 40 oz/in, or 7 to 25 oz/in, or 10 to 20 oz/in. In some embodiments, the pressure sensitive adhesive layer has an initial 180 degree peel adhesion test value in a range of 5 oz/in or greater or 7 oz/in or greater or 5 to 15 oz/in and an adhesion build value (for example, a one year dwell time to reach a final adhesion level) of 300% or less or 100% or less or a value of 40 oz/in or less or 30 oz/in or less, or 20 oz/in or less. The pressure sensitive adhesive layer can have a 30 minute gap test value of 3 mm or less or 2 mm or less and a haze test value of 10% or less or 5% or less or 2% or less. The pressure sensitive adhesive layer can also be colorless as measured and defined in the Example section. In some embodiments, the pressure sensitive adhesive layer can have a color measurement using the CIELAB color scale of L* value being 95 or better, an a* and b* value being below ±0.7 or below ±0.5. Physical property values are determined by the test methods set forth in the Example section.

In some embodiments, the pressure sensitive adhesive layer 100 can include 100 parts of an acrylic pressure sensitive adhesive having an inherent viscosity in a range of 0.7 to 2.0 dl/g, 0.1 to 3.0 parts or 0.1 to 0.1 part of a cross-linker, and 15 to 50 parts or 25 to 50 parts of a plasticizer compatible with the acrylic pressure sensitive adhesive.

In other embodiments, the pressure sensitive adhesive layer 100 can include 100 parts of an acrylic pressure sensitive adhesive having an inherent viscosity in a range of 0.3 to 0.7 dl/g, 0.2 to 5.0 parts of a cross-linker, and 5 to 40 parts or 5 to 30 parts of a plasticizer compatible with the acrylic pressure sensitive adhesive.

In further embodiments, the pressure sensitive adhesive layer 100 can include 100 parts of an acrylic pressure sensitive adhesive having an inherent viscosity in a range of 1.5 to 2.0 dl/g, 0.2 to 0.8 parts of a cross-linker, and 20 to 50 parts of a plasticizer compatible with the acrylic pressure sensitive adhesive.

In another embodiment, the pressure sensitive adhesive layer 100 can include 100 parts of an acrylic pressure sensitive adhesive having an inherent viscosity in a range of 0.5 to 1.0 dl/g, 0.4 to 1.0 parts of a cross-linker, and 10 to 35 parts of a plasticizer compatible with the acrylic pressure sensitive adhesive.

Acrylic PSAs generally include a primary component of acrylate or methacrylate monomer or a combination of such monomers which, when polymerized, have a low glass transition temperature (Tg) and a low modulus (i.e. they are rubbery and soft). These soft, tacky, low Tg monomers can be copolymerized with a secondary component consisting of high Tg monomers, usually polar monomers such as acrylic acid, methacrylic acid, itaconic acid, acrylamide, methacrylamide, and mixtures thereof. As described in U.S. Pat. No. Re 24,906, when such polar monomers are incorporated with a predominance of low Tg monomers, a sufficiently tacky pressure-sensitive adhesive is formed having high cohesive or internal strength. Further increase in internal or cohesive strength (i.e., shear strength) can be obtained via cross-linking.

In some embodiments, useful acrylic copolymers useful in the adhesive of the invention contain from about 50 to about 97 parts per hundred parts by weight monomer, or about 85 to about 97 parts per hundred parts monomer, contained in the copolymer of at least one monomer selected from the group consisting of a first monofunctional acrylate or methacrylate ester of a non-tertiary alkyl alcohol, the alkyl group of which comprises from 4 to about 12 carbon atoms, and mixtures thereof. Such acrylate or methacrylate esters generally have, as homopolymers, glass transition temperatures below about −25 degree Celsius.

Some useful acrylate or methacrylate ester monomers include, but are not limited to, n-butyl acrylate, n-butyl methacrylate, isobutyl acrylate, 2-methyl butyl acrylate, 2-ethylhexyl acrylate, n-octyl acrylate, isooctyl acrylate (IOA), isooctyl methacrylate, isononyl acrylate, isodecyl acrylate, or mixtures thereof. In some embodiments, particularly useful acrylates include isooctyl acrylate, n-butyl acrylate, 2-methyl butyl acrylate, 2-ethylhexyl acrylate, or mixtures thereof.

Useful copolymerizable acidic or polar monomers include, but are not limited to, ethylenically unsaturated carboxylic acids, ethylenically unsaturated sulfonic acids, or ethylenically unsaturated phosphoric acids. In some embodiments, useful acrylic acidic or polar monomers useful in the adhesive of the invention contain from about 3 to about 50 parts per hundred parts by weight monomer, or about 3 to about 15 parts per hundred parts monomer. Examples of such compounds include acrylic acid (AA), methacrylic acid, itaconic acid, fumaric acid, crotonic acid, citraconic acid and maleic acid, beta-carboxyethyl acrylate, sulfoethyl methacrylate, and the like, or mixtures thereof. Other useful polar monomers include, for example, acrylamide, N-alkyl substituted acrylamides, and hydroxyalkyl (meth)acrylates. Polar monomers like N-vinyllactams may also be used.

In some embodiments, the acrylic pressure sensitive adhesive includes a copolymer having 85 to 97 parts of a monomer selected from the group consisting of isooctyl acrylate, n-butyl acrylate, 2-methyl butyl acrylate, and 2-ethylhexyl acrylate, and 3 to 15 parts of a polar monomer selected from the group consisting of acrylic acid, methacrylic acid and acrylamide. In other embodiments, the acrylic pressure sensitive adhesive includes a copolymer having 85 to 95 parts of 2-methyl butyl acrylate, and 5 to 15 parts of acrylic acid. In still further embodiments, the acrylic pressure sensitive adhesive comprises a copolymer comprising 85 to 95 parts of isooctyl acrylate, and 5 to 15 parts of acrylic acid. In another embodiment, the acrylic pressure sensitive adhesive includes a copolymer having 90 to 97 parts of isooctyl acrylate, and 3 to 10 parts of acrylamide.

In some embodiments, secondary acrylate monomers having a Tg greater than −25 degrees Celsius, may be substituted for or partially replace hydrophilic monomers such as acrylic acid. Useful secondary acrylate monomers include isobornyl acrylate (IBA), ethyl acrylate, methyl acrylate, vinyl acetate, and the like.

The acrylic pressure sensitive adhesive layer 110 can have any useful thickness. In some embodiments, the acrylic pressure sensitive adhesive layer 110 has a thickness of 25 to 75 micrometers, or from 25 to 50 micrometers.

Crosslinking the pressure sensitive adhesive can assist in providing clean removability of the protective film from a substrate over a longer period of time. Clean removability refers to a removal of the protective film from a substrate (e.g., floor) that leaves less than 10% residue on the substrate, or where 5% or less of the protective film remains on the substrate, or where 1% or less of the protective film remains on the substrate. In some embodiments, removal of the protective film is accomplished by pulling the protective film away from the substrate. In many embodiments, the protective film can be cleanly removed without the use of additional removal solvents or chemicals.

This crosslinking can be chemical (or covalent) in nature, but it may also be ionic or physical in nature and achieved by adding a crosslinking agent to the pressure sensitive adhesive. One type of crosslinking agent is an organic compound which reacts with the other monomers by virtue of having a plurality of ethylenically unsaturated groups. These compounds are referred to as multifunctional acrylates herein. Alternatively, a crosslinking agent is a compound which can directly react with the polymeric backbone and result in crosslinking, for example, peroxide thermal cure or benzophenone UV cure.

The crosslinking agents are selected according to the polymerization method employed. In some embodiments, crosslinking agents for the PSAs prepared via photopolymerization on web are multifunctional acrylates such as 1,6-hexanediol diacrylate (HDDA) as well as those disclosed in U.S. Pat. No. 4,379,201, such as trimethylolpropane triacrylate, pentaerythritol tetraacrylate, 1,2-ethylene glycol diacrylate, and 1,12-dodecanediol diacrylate.

Additional useful crosslinking agents include hydrogen abstraction type photocrosslinkers such as those based on benzophenones, acetophenones, anthraquinones, and the like. These crosslinking agents can be copolymerizable or non-copolymerizable. Examples of non-copolymerizable hydrogen abstraction crosslinking agents include benzophenone; radiation-activatable crosslinking agents such as those described in U.S. Pat. No. 5,407,971. Examples of copolymerizable hydrogen abstraction initiator compounds include monoethylenically unsaturated aromatic ketones, particularly 4-acryloxybenzophenone (ABP), as described in U.S. Pat. No. 4,737,559. In addition, copolymerizable alpha-cleavage photoinitiators can be employed, such as acrylamido-functional di-substituted acetyl aryl ketones (such as those described in U.S. Pat. No. 5,506,279). In addition, combinations of multi-functional (meth)acrylates and the hydrogen abstraction type crosslinkers or copolymerizable alpha-cleavage photo initiators can be used. Low intensity UV light, such as "UV black light", is sufficient to induce crosslinking in most cases; however, when hydrogen abstraction type crosslinkers are used by themselves, high intensity UV exposure (such as by a microwave powered U.V. processor or a mercury lamp processor such as those available from Fusion, Aetek and others) is necessary to achieve sufficient crosslinking at high line speeds.

Other useful crosslinking agents include the substituted triazines, such as those disclosed in U.S. Pat. Nos. 4,329,384 and 4,330,590, e.g., 2,4-bis(trichloromethyl)-6-p-methoxystyrene-5-triazine and the chromophore halomethyl-5-triazines.

Crosslinking agents useful in solution polymerized PSAs useful in the invention are those which are free radically copolymerizable and which effect crosslinking through exposure to radiation, moisture or heat following polymerization. Such crosslinkers include the above mentioned photoactive substituted triazines and hydrogen abstraction type photocrosslinkers. Hydrolyzable, free radically copolymerizable crosslinkers, such as monoethylenically unsaturated mono-, di- and trialkoxy silane compounds including but not limited to methacryloxypropyltrimethoxysilane (sold under the tradename "Silane A-174" by Gelest Co.,) vinyldimethylethoxysilane, vinylmethyldiethoxysilane, vinyltriethoxysilane, vinyltrimethoxysilane, vinyltriphenoxysilane, and the like are also useful crosslinking agents. Heat activated copolymerizable crosslinking agents, including but not limited to N-methylol acrylamide and acrylamido glycolic acid, can also be used.

Aziridine crosslinking agents may also be useful. One type of aziridine crosslinking agent is bisamide. Bisamide crosslinking agents are described in U.S. Pat. No. 5,861,211, incorporated by reference herein. Ionic cross-linkers are described in U.S. Pat. No. 6,720,387, incorporated by reference herein.

In some embodiments, a crosslinking agent is a crosslinking agent present in an amount of from 0.05 to about 5 parts per 100 parts acrylic pressure sensitive adhesive. In other embodiments, a crosslinking agent is present in an amount of from 0.1 to about 3 part per 100 parts acrylic pressure sensitive adhesive. In some illustrative embodiments, covalent crosslinkers are added to the adhesive at 1 part or less or from 0.1 to 1 part. In further illustrative embodiments, ionic crosslinkers are added to the adhesive at 1 part or greater or from 1 to 5 parts.

Useful plasticizing agents are compatible with the acrylic pressure sensitive adhesive, such that once the plasticizing agent is mixed into the acrylic pressure sensitive adhesive, the plasticizing agent does not phase separate from the acrylic pressure sensitive adhesive. By "phase separation" or "phase separate," it is meant that by differential scanning calorimetry (DSC) no detectable thermal transition, such as a melting or glass transition temperature can be found for the pure plasticizing agent in the plasticized adhesive composition. Some migration of the plasticizing agent from or throughout the plasticized adhesive can be tolerated, such as minor separation due to composition equilibrium or temperature influences, but the plasticizing agent does not migrate to the extent that phase separation occurs between the adhesive and the plasticizing agent. Plasticizing agent compatibility with the adhesive can also be dependent upon the chemical nature of the plasticizing agent and the monomeric content of the adhesive.

In some embodiments, useful plasticizers include polyalkylene oxides having weight average molecular weights of 150 to about 5,000, or 150 to 1,500, such as polyethylene oxides, polypropylene oxides, polyethylene glycols; alkyl or aryl functionalized polyalkylene oxides, such as that commercially available from ICI Chemicals under the trade designation "PYCAL 94" (a phenyl ether of polyethylene oxide); monomethyl ethers of polyethylene oxides; monomeric adipates such as dioctyl adipate, dibutyl adipate, dibutoxyethoxyethyl adipate, and dibutoxypropoxypropyl adipate; polymeric adipates such as polyester adipates; citrates such as acetyltri-n-butyl citrate; phthalates such as butyl benzylphthalates, dibutyl phthalate, diisoctyl phthalate; trimellitates; sebacates such as dibutylsebacate; myristates such as isopropyl myristate; polyesters such as those commercially available from C.P. Hall Co. under the trade designation "PARAPLEX"; phosphate esters such as those commercially available from Monsanto under the trade designation "SANTICIZER" (e.g., 2-ethylhexyl diphenylphosphate and t-butylphenyl diphenylphosphate); glutarates such as that commercially available form C.P. Hall Co. under the trade designation "PLASTHALL 7050" (a dialkyl diether glutarate); other polymeric plasticizing agents such as polyarethanes, polyureas, polyvinylethers, polyethers, polyacrylates; and mixtures thereof.

In some embodiments, a plasticizer compatible with the acrylic pressure sensitive adhesive is present in an amount of from 5 to about 40 or 50 parts per 100 parts acrylic pressure sensitive adhesive. In other embodiments, a plasticizer compatible with the acrylic pressure sensitive adhesive is present in an amount of from 10 to about 40 parts per 100 parts acrylic pressure sensitive adhesive.

The protective floor film article can optionally include one or more additional layers (not shown). Additional layers can include, for example, a polymeric wear layer layer, a release liner layer, or a surface treatment layer.

In some embodiments, a polymeric wear layer layer can be disposed on the base floor film layer, such that the base floor film layer is disposed between the polymeric wear layer layer and the acrylic pressure sensitive adhesive layer. The polymeric wear layer layer can have a thickness from 2 to 25 micrometers. The polymeric wear layer layer can include inorganic nanoparticles such as, for example silica or alumina having a mean particle size in a range form 5 to 200 nanometers.

A release liner can optionally be disposed on the acrylic pressure sensitive adhesive prior to laminating the protective floor film onto the flooring substrate. Thus, the acrylic pressure sensitive adhesive layer can be disposed between the release liner and the base floor film layer. The release liner can be formed of any useful material such as, for example, polymers or paper and may include a release coat. Suitable materials for use in release coats are well known and include, but are not limited to, fluoropolymers, acrylics and silicones designed to facilitate the release of the release liner from the acrylic pressure sensitive adhesive. The release coat can be designed to remain substantially adhered to the release liner after the transfer of the film to the surface to be finished.

The surface of the base floor film layer which contacts the acrylic pressure sensitive adhesive layer can be a wide variety of materials. Therefore, surface treatments may be useful to secure adhesion between the base floor film layer and the acrylic pressure sensitive adhesive layer. Surface treatments include, for example, chemical priming or corona treatment.

A chemical primer layer or a corona treatment layer can be disposed between the base floor film layer 120 and the acrylic pressure sensitive adhesive layer 110. When a chemical primer layer and/or corona treatment is employed, inter-layer adhesion between the base floor film layer 120 and the acrylic pressure sensitive adhesive layer 110 can be improved.

Suitable chemical primer layers may be selected from urethanes, epoxy resins, vinyl acetate resins, and the like. Examples of chemical primers for vinyl and polyethylene terephthalate films include crosslinked acrylic ester/acrylic acid copolymers disclosed in U.S. Pat. No. 3,578,622. The thickness of the chemical primer layer is suitably within the range of 10 to 3,000 nanometers (nm).

Corona treatment is a useful physical priming suitably applied to the base floor film layer 120 onto which is then coated the acrylic pressure sensitive adhesive layer 110. Corona treatment can improve the inter-layer adhesion between the base floor film layer 120 and the acrylic pressure sensitive adhesive layer 110. Corona treatment of films is a well-known technique, and is described generally in Cramm, R. H., and Bibee, D. V., The Theory and Practice of Corona Treatment for Improving Adhesion, TAPPI, Vol. 65, No. 8, pp 75-78 (August 1982), and in U.S. Defensive publication H 688, published Oct. 3, 1989.

Figure 2:
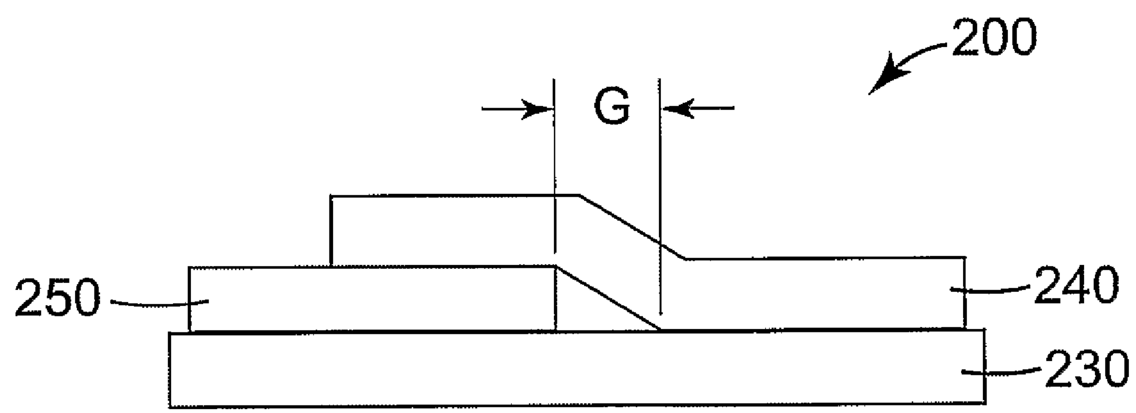
FIG. 2 is a schematic diagram of overlapping protective floor film articles disposed on a flooring substrate.

FIG. 2 is a schematic diagram of overlapping protective floor film articles 200 disposed on a flooring substrate 230. A first protective floor film 240 is shown overlapping a portion of a second protective floor film 250. The protective floor films 240, 250 are described above and can be laminated such that a portion of the protective floor films overlap each other along "seams" in the protective film program. In some embodiments, a gap "G" formed along the overlapping protective floor film interface can be 3 millimeters or less, or 2 millimeters or less.

The protective floor films 240, 250 can be laminated onto the flooring substrate 230 at any useful rate. In some embodiments, the protective floor films 240, 250 are laminated onto the flooring substrate 230 at a rate of 0.005 meters per second, or 0.05 meters per second, or 0.5 meters per second.

The protective floor films 240, 250 can be cleanly removed from the flooring substrate 230 at any useful rate. In some embodiments, the protective floor films 240, 250 are removed from the flooring substrate 230 at a rate of 0.005 meters per second, or 0.05 meters per second, or 0.5 meters per second.

In some embodiments, the protective floor film can be laminated onto the flooring substrate as separate layers. For example, the adhesive layer can be laminated to the flooring substrate and then the base floor film layer can be laminated to the adhesive layer. The adhesive layer can include a release liner that is removed prior to laminating the base layer on the adhesive layer.

As described herein, the acrylic pressure sensitive adhesive enables a successful application of a protective floor film to a flooring substrate. This adhesive can enable the application of clear protection films to floors while still providing long-term removability and environmental stability to the protective floor film product. This adhesive allows for the application of a protective floor film at high speeds with near instant wetting for optimal visual clarity while still incorporating the necessary adhesive performance to prevent edge lifting and reduce gap formation with a low angle peel resistance and low rate peel resistance.

The peel behavior, the lifting resistance, and removability of the film construction can depend on all components (wear layer, film backing, and adhesive) and their interaction. For example, if the balance of the film construction is highly compliant and stretchable, the adhesive is subject to lower stresses in such areas as overlap splices and depressions in a floor. As a result, one can crosslink the adhesive more to gain cohesive strength, while maintaining good holding power in these areas. A stiff backing may impose more stresses on the adhesive requiring either a lower degree of crosslinking, a higher molecular weight base polymer, or a combination thereof to maintain a balance of cohesive strength and good stress-relaxation. Based on the above performance characteristics the adhesive performance can be "tuned" as follows: (1) To maintain long-term removability, the adhesive is plasticized, for a given base polymer, higher levels of plasticizer lower the ultimate peel force. While generally higher molecular weight polymer with higher polar monomer content can tolerate more plasticizer, levels in excess of 50 parts plasticizer per hundred parts polymer weaken the adhesive too much, causing it to fail cohesively and leave residue upon removal; (2) Crosslinking can be used to increase cohesive strength and to minimize adhesion build to the substrate. As the molecular weight of the polymer is increased the amount of crosslinker can be decreased; (3) If low angle peel resistance (such as for overlap splicing) is desired, then the adhesive is allowed to stress-relax. In those cases, higher molecular weight polymers (Mw>800,000 Daltons) with lower levels of crosslinker (<0.4 parts per hundred) are generally desired; (4) To achieve high quick-stick and wetting of the substrate, the adhesive needs to be highly compliant, that can be achieved by plasticizing the adhesive. Higher plasticizer levels are generally preferred, but at levels above 50 parts per hundred it becomes more difficult to maintain cohesive strength and clean removability; (5) To achieve good wetting, good initial adhesion, and easy removability at high application speeds (>100"/min), the glass transition temperature (Tg) of the adhesive needs to be low, that can be achieved by plasticizing the acrylic base polymer. In general a Tg below −10 degrees C. is desired, or below −15 degrees C.

The present invention should not be considered limited to the particular examples described herein, but rather should be understood to cover all aspects of the invention as fairly set out in the attached claims. Various modifications, equivalent processes, as well as numerous structures to which the present invention can be applicable will be readily apparent to those of skill in the art to which the present invention is directed upon review of the instant specification.

EXAMPLES

Methods

Inherent Viscosity

The inherent viscosities (IV) reported herein are obtained by measuring (the polymer before crosslinking) using conventional methods used by those skilled in the art. The IVs are obtained using a Cannon-Fenske #50 viscometer in a water bath controlled at 25° C., to measure the flow time of 10 ml of a polymer solution (0.2 g per deciliter polymer in ethyl acetate). The test procedure followed and the apparatus used are described in detail in *Textbook of Polymer Science*, F. W. Billmeyer, Wiley-Interscience, Second Edition, 1971, Pages 84 and 85.

Glass Transition Temperature (Tg)

The Fox Equation (Fox, T. G., *Bull. Am. Phys. Soc.,* 1, (1956). p. 123) can be used to estimate Tg.

180 Degree Peel Adhesion Test (according to ASTM D3330):

Adhesive samples are formed on 2 mil PET (Mitsubishi 4507, available from Mitsubishi, Greer, S.C.) as described in the Sample Preparation section below.

Use a 3M90 or SP2000 IMASS (commercially available from IMASS Inc., Accord, Mass.) Peel Tester.

Cut ½ inch wide strip of adhesive sample approximately 6-8 inch long.

Tab approximately ¼ inch of one end of adhesive sample.

Attach tabbed end to a vinyl composite tile (VCT) having four coats of Spangle floor finish (commercially available from 3M, St. Paul, Minn.) testing substrate and, while holding "tail" end of sample at a 45 degree angle laminate sample to substrate with one pass of a 4.5 lb roller at the specified rate starting at the tabbed end.

For an initial peel adhesion value testing, sample dwell time should be less than 1 minute.

Peel sample from tile at 12 inches per minute and record Peak, Valley, and Average force in ozs per ½ inch (multiply by 2 to obtain ozs per inch).

Peel three replicates for each sample.

Prepare samples for 1 day, 1 week, and 1 month dwell times and store in CTH (constant temperature (21 degrees Celsius) and humidity (50%)) room.

Repeat peel test as specified after one day, 1 week, and 1 month dwell time and record result.

Overlap Splice Gap

Laminate two 1 inch wide strips of sample to a vinyl composite tile (VCT) having four coats of Spangle floor finish (commercially available from 3M, St. Paul, Minn.) with one pass of a 4.5 lb roller at 12 inches per minute, one overlapping the other to form an overlapping sample structure, as shown in FIG. 2.

Bring samples to the optical microscope and close the gap by pressing on the film with a pen cap or other tool. The tool must have an edge that can get into the gap, but rounded so that the film is not damaged.

Measure the gap with the aid of the microscope immediately, and again at 5 min, 10 min, and 30 min. The gap is illustrated at FIG. 2 as the distance "G".

Techniques for measuring gap: Note the range representative of the gap for the width of the sample, ignoring end effects. Record the range, and use the midpoint for data analysis.

Clarity

This test was carried out by applying the samples described in the 180 degree peel adhesion test above. A black tile was used to make the visual analysis. A sample was labeled to be "clear" if the applied sample looked a deep, shiny black in color. A sample was labeled "good" if the sample looked black with a slight grayish tint. It was labeled "no" if the samples looked grey or air bubbles where clearly visible.

Haze

The film sample was laminated with a hand roller to a 4×4 inch LEXAN™ polycarbonate tile (available from GE plastics. Pittsfield, Mass.). Haze % of the tile was measured prior to lamination and following lamination. Immediately after laminating the film to the tile, haze measurements were done with a haze reading machine: BYK Gardner haze guard plus Cat. No. 4725. The haze was measured in 4 places around the tile at the 12, 3, 6, and 9 o'clock positions with the measuring area of the haze meter at about an inch from the edge of the tile. This procedure was repeated at varying time intervals after the initial measurements were done. Three repeats per sample were done for each haze determination. Results are reported as % haze change of the tile prior to and following lamination.

Color Measurement

Color measurements were done with a TCS Plus Spectrophotometer available from BYK Gardner USA. Calculations were done using the CIELAB (French abbreviation for Commission of Lighting) color scale of L*, a*, b*. From a theoretical perspective a colorless adhesive or film construction would have an L* value of 100, and both a* and b* values of zero. In some embodiments, adhesives described herein have a L* value of 90 or better, or 95 or better, an a* and b* value below ±0.7, preferably ±0.5. These values can at least be met during the initial application of the adhesive, and, in at least some embodiment, not be exceeded during the life of the adhesive when applied on the substrate. Air was used as reference.

Sample Preparation

A solution adhesive is formed by mixing a specified amount of either Low I.V. or High I.V. acrylic adhesive and plasticizer in a container until completely mixed. Just prior to coating, a specified amount of bisamide cross-linker is added to the mixed solution adhesive and again completely mixed.

This solution adhesive is knife-coated on a siliconized paper release liner (commercially available from Loperex, Willowbrook, Ill.,) and allowed to dry in a ventilated oven at 70 degrees Celsius for 15 minutes to dry and cross-link the adhesive. This dried adhesive film is laminated to a backing of choice (acrylic primed 2 mil PET (Mitsubishi 4507, available from Mitsubishi, Greer, S.C.,) or nitrogen corona treated (at 1.7 J/cm$^2$) Surlyn™) to a dry thickness of 50 micrometers. Once the backing is laminated to the adhesive, it is allowed to dwell at least 12 hours so that the adhesive bonds to the backing. The sample (Examples 1-19) is then tested as described herein.

High I.V. Acrylic Adhesive

The High I.V. acrylic adhesive polymer can be made by polymerization of 2-methyl butyl acrylate and glacial acrylic acid in the weight ratio 89.3/10.7 (hereinafter referred to as "90/10") in ethyl acetate as the polymerization solvent. All amounts to be added to the reaction vessel below are based on 100 parts by weight of the total reaction mixture. To the reaction vessel add 32.2 parts 2-methyl butyl acrylate, 3.85 parts glacial acrylic acid, 61.5 parts ethyl acetate. With agitation of the reaction mixture, purge oxygen, a reaction inhibitor, from the reaction vessel by standard methods (such as by bubbling nitrogen through the reaction mixture for sufficient time). Warm the reaction mixture to 138° F. (58.9° C.). To initiate polymerization, to the reaction mixture add 0.036 parts Luperox A75 (Atofina) dissolved in 1.2 parts ethyl acetate. Maintain the reaction mixture under inert gas to prevent oxygen from entering the mixture. Once the reaction begins, maintain the reaction temperature at 140° F.±2° F. (60° C.±1.1° C.) for ten hours. Then, to the reaction mixture add 0.036 parts Luperox A75 dissolved in 1.2 parts ethyl acetate. 100 parts total has now added to the reaction mixture. While maintaining the reaction temperature at 140° F.±2° F. (60° C.±1.1° C.), under inert gas to prevent oxygen from entering the mixture, react another 2 to 4 hours, or until at least 90% of the original monomers added have been polymerized. This will produce a polymer with an inherent viscosity (IV) of about 1.8 dl/gm (within the range of about 1.7 to 2.0 dl/gm). The glass transition temperature for this High I.V. acrylic adhesive is Tg=−33.9° C.

Low I.V. Acrylic Adhesive

The Low I.V. acrylic adhesive polymer is made by polymerization of 2-methyl butyl acrylate and glacial acrylic acid in the weight ratio 90/10 in a mixture of reaction-grade heptane and acetone in the weight ratio heptane/acetone 65/35 as the polymerization solvent. The reaction-grade heptane is available from Chevron-Phillips Chemical Company as "heptane blend low aromatic." All amounts to be added to the reaction vessel are based on 100 parts by weight of the total reaction mixture. To the reaction vessel add 42.7 parts 2-methyl butyl acrylate, 4.7 parts glacial acrylic acid, 18 parts acetone, and 33.5 parts reaction-grade heptane. With agitation of the reaction mixture, purge oxygen, a reaction inhibitor, from the reaction vessel by standard methods (such as by bubbling nitrogen through the reaction mixture for sufficient time). Warm the reaction mixture to 142° F. (60.1° C.). To initiate polymerization, to the reaction mixture add 0.03 parts Vazo™ 64 (DuPont) dissolved in 0.47 parts acetone. Maintain reaction mixture under inert gas to prevent oxygen from entering the mixture. Once reaction begins, allow the temperature to climb to 150° F. (65.6° C.) and maintain temperature at 150° F.±2° F. (65.6° C.±1.1° C.) for four hours. Next, to the reaction mixture add 0.03 parts Vazo™ 64 dissolved in 0.47 parts acetone. 100 parts total has now added to the reaction mixture. While maintaining the reaction temperature at 150° F.±2° F. (65.6° C.±1.1° C.), under inert gas to prevent oxygen from entering the mixture, react another 9 to 11 hours, or until at least 95% of the original monomers added have been polymerized. This will produce a polymer with an inherent viscosity (IV) of about 0.8 dl/gm (within the range of about 0.7 to 0.85 dl/gm). The Tg for this Low I.V. acrylic adhesive is Tg=−34.6° C.

Example 1

100 parts of 90/10 2-methylbutylacrylate/acrylic acid adhesive (Low I.V.) was mixed with 30 parts of octyl diphenyl phosphate plasticizer (Santicizer™ 141 commercially available from Ferro Corp., Cleveland, Ohio) and 0.4 part bisamide cross-linker (see U.S. Pat. No. 5,861,211 incorporated by reference herein) as described above. A sample with this adhesive was produced on a PET backing and tested as described above. Table 1 illustrates the results of the testing.

Example 2

100 parts of 90/10 2-methylbutylacrylate/acrylic acid adhesive (High I.V.) was mixed with 40 parts of octyl diphenyl phosphate plasticizer (Santicizer™ 141) and 0.2 part bisamide cross-linker, as described above. A sample with this adhesive was produced on a PET backing and tested as described above. Table 1 illustrates the results of the testing.

Example 3

100 parts of 90/10 2-methylbutylacrylate/acrylic acid adhesive (Low I.V.) was mixed with 20 parts of octyl diphenyl phosphate plasticizer (Santicizer™ 141) and 0.8 part bisamide cross-linker, as described above. A sample with this adhesive was produced on a Surlyn backing and tested as described above. Table 1 illustrates the results of the testing.

Example 4

100 parts of 90/10 2-methylbutylacrylate/acrylic acid adhesive (Low I.V.) was mixed with 25 parts of octyl diphenyl phosphate plasticizer (Santicizer™ 141) and 0.6 part bisamide cross-linker, as described above. A sample with this adhesive was produced on a Surlyn backing and tested as described above. Table 1 illustrates the results of the testing.

Example 5

100 parts of 90/10 2-methylbutylacrylate/acrylic acid adhesive (Low I.V.) was mixed with 30 parts of octyl diphenyl phosphate plasticizer (Santicizer™ 141) and 0.4 part bisamide cross-linker, as described above. A sample with this adhesive was produced on a Surlyn backing and tested as described above. Table 1 illustrates the results of the testing.

Example 6

100 parts of 90/10 2-methylbutylacrylate/acrylic acid adhesive (High I.V.) was mixed with 30 parts of octyl diphenyl phosphate plasticizer (Santicizer™ 141) and 0.4 part bisamide cross-linker, as described above. A sample with this adhesive was produced on a Surlyn backing and tested as described above. Table 1 illustrates the results of the testing.

Example 7

100 parts of 90/10 2-methylbutylacrylate/acrylic acid adhesive (High I.V.) was mixed with 40 parts of octyl diphenyl phosphate plasticizer (Santicizer™ 141) and 0.6 part bisamide cross-linker, as described above. A sample with this adhesive was produced on a Surlyn backing and tested as described above. Table 1 illustrates the results of the testing.

Example 8

100 parts of 90/10 2-methylbutylacrylate/acrylic acid adhesive (Low I.V.) was mixed with 20 parts of octyl diphenyl phosphate plasticizer (Santicizer™ 141) and 0.8 part bisamide cross-linker, as described above. A sample with this adhesive was produced on a Surlyn backing and tested as described above. Table 1 illustrates the results of the testing.

Example 9

100 parts of 90/10 2-methylbutylacrylate/acrylic acid adhesive (Low I.V.) was mixed with 25 parts of octyl diphenyl phosphate plasticizer (Santicizer™ 141) and 0.8 part bisamide cross-linker, as described above. A sample with this adhesive was produced on a Surlyn backing and tested as described above. Table 1 illustrates the results of the testing.

Example 10

100 parts of 90/10 2-methylbutylacrylate/acrylic acid adhesive (Low I.V.) was mixed with 30 parts of octyl diphenyl phosphate plasticizer (Santicizer™ 141) and 0.8 part bisamide cross-linker, as described above. A sample with this adhesive was produced on a Surlyn backing and tested as described above. Table 1 illustrates the results of the testing.

Example 11

100 parts of 90/10 2-methylbutylacrylate/acrylic acid adhesive (Low I.V.) was mixed with 20 parts of octyl diphenyl phosphate plasticizer (Santicizer™ 141) and 0.8 part bisamide cross-linker, as described above. A sample with this adhesive was produced on a PET backing and tested as described above. Table 1 illustrates the results of the testing.

Example 12

100 parts of 90/10 2-methylbutylacrylate/acrylic acid adhesive (Low I.V.) was mixed with 25 parts of octyl diphenyl phosphate plasticizer (Santicizer™ 141) and 0.6 part bisamide cross-linker, as described above. A sample with this adhesive was produced on a PET backing and tested as described above. Table 1 illustrates the results of the testing.

Example 13

100 parts of 90/10 2-methylbutylacrylate/acrylic acid adhesive (Low I.V.) was mixed with 30 parts of octyl diphenyl phosphate plasticizer (Santicizer™ 141) and 0.8 part bisamide cross-linker, as described above. A sample with this adhesive was produced on a PET backing and tested as described above. Table 1 illustrates the results of the testing.

Example 14

100 parts of 90/10 2-methylbutylacrylate/acrylic acid adhesive (High I.V.) was mixed with 20 parts of octyl diphenyl phosphate plasticizer (Santicizer™ 141) and 0.6 part bisamide cross-linker, as described above. A sample with this adhesive was produced on a PET backing and tested as described above. Table 1 illustrates the results of the testing.

Example 15

100 parts of 90/10 2-methylbutylacrylate/acrylic acid adhesive (High I.V.) was mixed with 40 parts of octyl diphenyl phosphate plasticizer (Santicizer™ 141) and 0.6 part bisamide cross-linker, as described above. A sample with this adhesive was produced on a PET backing and tested as described above. Table 1 illustrates the results of the testing.

Example 16

100 parts of 90/10 2-methylbutylacrylate/acrylic acid adhesive (Low I.V.) was mixed with 20 parts of octyl diphenyl phosphate plasticizer (Santicizer™ 141) and 0.4 part bisamide cross-linker, as described above. A sample with this adhesive was produced on a Surlyn backing and tested as described above. Table 1 illustrates the results of the testing.

Example 17

100 parts of 90/10 2-methylbutylacrylate/acrylic acid adhesive (High I.V.) was mixed with 20 parts of octyl diphenyl phosphate plasticizer (Santicizer™ 141) and 0.2 part bisamide cross-linker, as described above. A sample with this adhesive was produced on a Surlyn backing and tested as described above.

Example 18

100 parts of 90/10 2-methylbutylacrylate/acrylic acid adhesive (Low I.V.) was mixed with 20 parts of octyl diphenyl phosphate plasticizer (Santicizer™ 141) and 0.4 part bisamide cross-linker, as described above. A sample with this adhesive was produced on a 2 mil PET film (Mitsubishi 4507, available from Mitsubishi, Greer, S.C.,). An U.V. cured acrylic wear layer including silica nanoparticles was coated (5 micrometer dry thickness) onto the opposite side of the PET film.

The U.V. cured acrylic wear layer can be formed as follows. In a round-bottomed flask were mixed 1195 grams Nalco 2327 silica sol, commercially available from Nalco Chemical Co. (an ammonium ion-stabilized dispersion having a pH of 9.3 of colloidal silica particles, 40 percent solids, with an average particle diameter of 20 nanometers); 118 grams N,N-dimethyl acrylamide, commercially available from Aldrich Chemical Co; 120 grams 3-(trimethoxysilyl) propyl methacrylate coupling agent, commercially available from Aldrich Chemical Co.; and 761 grams pentaerythritol triacrylate (SR444 available from Sartomer Co., West Chester, Pa.) The round-bottomed flask was subsequently mounted on the vacuum line of a Buchi R152 Rotavapor, commercially available from Buchi Laboratory AG, Flanil, Switzerland with the bath temperature set to 55° C. A refrigerated mixture of 50 percent deionized water/50 percent antifreeze, was recirculated through the cooling coils. Volatile components were removed at a reduced pressure of 25 Torr until the distillation rate was reduced to less than 5 drops per minute (approximately 2 hours.) The resulting material (1464 grams) was a clear liquid dispersion of acrylated silica particles in a mixture of N,N-dimethyl acrylamide and pentaerythritol triacrylate monomers (a ceramer composition). The Carl Fisher analysis of this ceramer composition indicated that the residual water in the composition is less than 1.5 percent by weight relative to the total weight of the composition. To this mixture was added 1282 grams of isopropanol, 87 grams of water, 29 grams of Tinuvin 292, and 36 grams of Irgacure 184 (photoinitiator available from Ciba Geigy.) The final composition has is 50% solids and is amber to hazy in appearance. As described above, samples were coated onto the PET at a thickness of 5 micrometers. Curing was carried out using a UV Processor using medium pressure mercury lamps at about 200 to 240 mJ/cm$^2$, 50 ft/min, using a RPC UV processor (RPC Industries, Plainfield, Ill.), normal/normal settings, nitrogen purge and then heated in an oven to complete the cure.

Table 1 illustrates the results of the testing.

TABLE 1

| | 180 degree Peel Adhesion (ounces/inch) | | | Gap Test (micrometers) | | | |
|---|---|---|---|---|---|---|---|
| Example | Initial | 1 Day | 1 Week | Initial | 5 min | 30 min | Clarity |
| 1 | 9.06 | 14.54 | 19.8 | 40 | 760 | 1080 | good |
| 2 | 9.46 | 18.8 | 22.9 | 160 | 520 | 1460 | clear |
| 3 | 18.2 | 29.9 | 28.8 | 240 | 1260 | 1320 | clear |
| 4 | 14.9 | 27.7 | 25.5 | 260 | 1260 | 1320 | clear |
| 5 | 16.6 | 30.8 | 27.5 | 120 | 760 | 800 | clear |
| 6 | 11.6 | 23.0 | 30.7 | 400 | 1400 | 1420 | clear |
| 7 | 8.46 | 14.7 | 19.2 | 500 | 1700 | 1700 | clear |
| 8 | 18.6 | 29.9 | 25.6 | 220 | 980 | 1100 | clear |
| 9 | 15.0 | 26.5 | 24.5 | 500 | 960 | 1040 | clear |
| 10 | 9.80 | 16.6 | 15.1 | 600 | 1320 | 1360 | clear |
| 11 | 6.2 | 10.8 | 11.3 | 420 | 1540 | 2000 | No |
| 12 | 8.8 | 14.4 | 13.8 | 200 | 840 | 1320 | No |
| 13 | 4.14 | 8.4 | 7.54 | 560 | 1580 | 2000 | No |
| 14 | 8.14 | 18.2 | 17.0 | 540 | 1160 | 1800 | No |
| 15 | 3.86 | 8.20 | 8.80 | 260 | 1440 | 2000 | No |
| 16 | 24.8 | 48.8 | 43.9 | 260 | 460 | 560 | clear |
| 17 | 22.8 | 44.2 | 46.3 | 80 | 560 | 760 | clear |
| 18 | 9.54 | 21.54 | 23.4 | 1 | 3.1 | 9.6 | clear |

Samples of Example 18 were tested for 180 degree peel at a variety of rates as indicated at Table 2. Table 2 illustrates the results of the testing (results in oz/in.)

TABLE 2

| Rate (in/min) | 1 Day Peak | 1 Day Valley | 1 Day Average | 1 Week Peak | 1 Week Valley | 1 Week Average |
|---|---|---|---|---|---|---|
| 12 | 15.4 | 14 | 14.6 | 16.6 | 13.8 | 15.2 |
| 12 | 15.6 | 13.4 | 14.6 | 17 | 9.4 | 14.3 |
| 60 | 34.6 | 26.8 | 30 | 30.4 | 26 | 28.8 |
| 60 | 32.8 | 28.8 | 30 | 30.2 | 24.4 | 27.8 |
| 90 | 33.2 | 22.8 | 30.6 | 34.4 | 29.8 | 32.4 |
| 90 | 34.2 | 27 | 31.4 | 34.6 | 29.6 | 32.4 |
| 120 | 36.2 | 29.4 | 33.6 | 39.6 | 31 | 35.6 |
| 120 | 35.6 | 28.2 | 34 | 38.4 | 31.2 | 35 |
| 200 | 40 | 31.8 | 37.4 | 43.2 | 30.4 | 40.2 |
| 200 | 43.6 | 33.6 | 40 | 40.4 | 33 | 38 |

Example 18 was tested for haze at initial application, 24 hours after initial application and 120 hours after initial application as indicated at Table 3. Table 3 illustrates the results of the testing (results in % haze.)

TABLE 3

| Example | Initial haze % | 24 hrs haze % | 120 hrs haze % |
|---|---|---|---|
| 18 | 3.96 | 1.72 | 1.55 |

Example 18 (a free standing film) was tested for initial color as described in the Method section above. As a reference, air was measured to have a color value (L*, a*, b*) of 100, 0, 0. Table 4 illustrates the results of the color testing.

TABLE 4

| | Initial Color |
|---|---|
| L* | 96.7 |
| a* | −0.03 |
| b* | −0.47 |

We claim:

1. A protective floor film adhesive composition comprising:

an acrylic pressure sensitive adhesive having an inherent viscosity in a range of 0.3 dl/g or greater;

a cross-linker; and 15 to 50 parts per 100 parts of acrylic pressure sensitive adhesive of a plasticizer compatible with the acrylic pressure sensitive adhesive;

wherein, the adhesive composition has a glass transition temperature of −10 degrees Celsius or less, and the adhesive composition has an initial 180 degree peel adhesion test value of 5 oz/in or greater and builds to a final 180 degree peel adhesion test value of 40 oz/in or less, and a haze test value of 10% or less.

2. A protective film adhesive according to claim 1, wherein the adhesive composition has a 30 minute gap test value of 3 mm or less.

3. A protective film adhesive according to claim 1, wherein the adhesive composition comprises:

100 parts of an acrylic pressure sensitive adhesive having an inherent viscosity in a range of 0.7 to 2.0 dl/g; and 0.1 to 3.0 parts of a cross-linker.

4. A protective film adhesive according to claim 1, wherein the adhesive composition comprises:

100 parts of an acrylic pressure sensitive adhesive having an inherent viscosity in a range of 1.5 to 2.0 dl/g;

0.2 to 0.8 parts of a cross-linker; and 20 to 50 parts of a plasticizer compatible with the acrylic pressure sensitive adhesive.

5. A protective film adhesive according to claim 1, wherein the acrylic pressure sensitive adhesive comprises a copolymer comprising 85 to 97 parts of a monomer selected from the group consisting of isooctyl acrylate, n-butyl acrylate, 2-methyl butyl acrylate, and 2-ethylhexyl acrylate, and 3 to 15 parts of a polar monomer selected from the group consisting of acrylic acid, methacrylic acid and acrylamide.

6. A protective film adhesive according to claim 1, wherein the acrylic pressure sensitive adhesive comprises a copolymer comprising 85 to 95 parts of 2-methyl butyl acrylate, and 5 to 15 parts of acrylic acid.

7. A protective film adhesive according to claim 1, wherein the acrylic pressure sensitive adhesive comprises a copolymer comprising 85 to 95 parts of isooctyl acrylate, and 5 to 15 parts of acrylic acid.

8. A protective film adhesive according to claim 1, wherein the acrylic pressure sensitive adhesive comprises a copolymer comprising 90 to 97 parts of isooctyl acrylate, and 3 to 10 parts of acrylamide.

9. A protective film adhesive according to claim 1, wherein the cross-linker comprises an aziridine.

10. A protective film adhesive according to claim 1, wherein the cross-linker comprises a photocrosslinker.

11. A protective film adhesive according to claim 1, wherein the plasticizer comprises a phosphate ester.

12. A protective film adhesive according to claim 1, wherein the plasticizer comprises an octyl diphenyl phosphate.

13. A protective film adhesive according to claim 1, wherein the adhesive composition has an initial 180 degree peel adhesion test value of 5 oz/in or greater and builds to a final 180 degree peel adhesion test value of 30 oz/in or less.

14. A protective film adhesive according to claim 1, wherein the adhesive composition has an initial 180 degree peel adhesion test value of 7 oz/in or greater and builds to a final 180 degree peel adhesion test value of 20 oz/in or less.

15. A protective film adhesive according to claim 1, wherein the adhesive composition has an initial 180 degree peel adhesion test value in a range of 5 to 15 oz/in.

16. A protective film adhesive according to claim 15, wherein the adhesive composition has an adhesion build value of 300% or less.

17. A protective film adhesive according to claim 15, wherein the adhesive composition has an adhesion build value of 100% or less.

18. A protective floor film article comprising:

a base floor film layer; and an acrylic pressure sensitive adhesive layer disposed on the base floor film layer; wherein the an acrylic pressure sensitive adhesive comprises:

an acrylic pressure sensitive adhesive having an inherent viscosity in a range of 0.3 dl/g or greater;

a cross-linker; and 15 to 50 parts per 100 parts of acrylic pressure sensitive adhesive of a plasticizer compatible with the acrylic pressure sensitive adhesive;

wherein, the adhesive composition has a glass transition temperature of −10 degrees Celsius or less and the adhesive composition has an initial 180 degree peel adhesion test value of 5 oz/in or greater and builds to a final 180 degree peel adhesion test value of 40 oz/in or less, and a haze test value of 10% or less.

19. A protective film article according to claim 18, wherein the adhesive composition has a 30 minute gap test value of 3 mm or less.

20. A protective film article according to claim 18, wherein the base floor film layer has a thickness in a range of 25 to 250 micrometers.

21. A protective film article according to claim 18, wherein the base floor film layer comprises a polymer.

22. A protective film article according to claim 18, wherein the base floor film layer comprises a transparent polymer.

23. A protective film article according to claim 18, wherein the base floor film layer comprises a transparent polyolefin or polyester.

24. A protective film article according to claim 18, further comprising a polymeric wear layer layer disposed on the base floor film layer, the base floor film layer being disposed between the polymeric wear layer layer and the acrylic pressure sensitive adhesive layer, and the polymeric wear layer layer has a thickness in a range of 2 to 25 micrometers.

25. A protective film article according to claim 18, further comprising a release layer disposed on the acrylic pressure sensitive adhesive layer, the acrylic pressure sensitive adhesive layer being disposed between the base floor film layer and the release layer.

26. A protective film article according to claim 24, further comprising a release layer disposed on the acrylic pressure sensitive adhesive layer, the acrylic pressure sensitive adhesive layer being disposed between the base floor film layer and the release layer.

27. A protective film article according to claim 18, further comprising a surface treatment layer disposed between the base floor layer and the acrylic pressure sensitive adhesive layer.

28. A method of protecting flooring comprising steps of:

providing a protective floor film comprising:

a base floor film layer; and an acrylic pressure sensitive adhesive layer disposed on the base floor film layer; wherein the an acrylic pressure sensitive adhesive comprises:

an acrylic pressure sensitive adhesive having an inherent viscosity in a range of 0.3 dl/g or greater;

a cross-linker; and 15 to 50 parts per 100 parts of acrylic pressure sensitive adhesive of a plasticizer compatible with the acrylic pressure sensitive adhesive;

wherein, the adhesive composition has a glass transition temperature of −10 degrees Celsius or less and the adhesive composition has an initial 180 degree peel adhesion test value of 5 oz/in or greater and builds to a final 180 degree peel adhesion test value of 40 oz/in or less, and a haze test value of 10% or less; and laminating the protective floor film onto a floor surface.

29. A method according to claim 28, wherein the providing step comprises:

providing a protective floor film comprising:

a base floor film layer;

an acrylic pressure sensitive adhesive layer disposed on the base floor film layer; and a release liner disposed on the acrylic pressure sensitive adhesive layer, wherein the acrylic pressure sensitive adhesive layer is disposed between the release liner and the base floor film layer.

30. A method according to claim 28, wherein the providing step comprises:

providing a protective floor film comprising:

a base floor film layer;

an acrylic pressure sensitive adhesive layer disposed on the base floor film layer; and a polymeric wear layer layer disposed on the base floor film layer, wherein the base floor film layer is disposed between the polymeric wear layer layer and the acrylic pressure sensitive adhesive layer.

31. A method according to claim 29, wherein the providing step comprises:

providing a protective floor film comprising:

a base floor film layer;

an acrylic pressure sensitive adhesive layer disposed on the base floor film layer; and a polymeric wear layer layer disposed on the base floor film layer, wherein the base floor film layer is disposed between the polymeric wear layer layer and the acrylic pressure sensitive adhesive layer.

32. A method according to claim 28, wherein the laminating step comprises laminating the protective floor film onto a floor surface at a rate of at least 0.05 meters per second.

33. A method according to claim 28, wherein the laminating step comprises laminating the protective floor film onto a floor surface at a rate of at least 0.5 meters per second.

34. A method of protecting flooring comprising steps of:

providing a protective floor film comprising:

a base floor film layer; and an acrylic pressure sensitive adhesive layer disposed on the base floor film layer; wherein the an acrylic pressure sensitive adhesive comprises:

an acrylic pressure sensitive adhesive having an inherent viscosity in a range of 0.3 dl/g or greater;

a cross-linker; and 15 to 50 parts per 100 parts of acrylic pressure sensitive adhesive of a plasticizer compatible with the acrylic pressure sensitive adhesive;

wherein, the adhesive composition has a glass transition temperature of −10 degrees Celsius or less and the adhesive composition has an initial 180 degree peel adhesion test value of 5 oz/in or greater, and a haze test value of 10% or less;

laminating the protective floor film onto a floor surface; and removing the protective floor film from the floor surface to form a removed protective floor film, wherein 10% or less of the protective floor film remains on the floor surface.

35. A method according to claim 34, wherein the removing step comprises removing the protective floor film from the floor surface to form a removed protective floor film, wherein 5% or less of the protective floor film remains on the floor surface.

36. A method according to claim 34, wherein the removing step comprises removing the protective floor film from the floor surface to form a removed protective floor film, wherein 1% or less of the protective floor film remains on the floor surface.

37. A method according to claim 34, wherein the removing step comprises removing the protective floor film from the floor surface at a rate of at least 0.05 meters per second.

38. A method according to claim 34, wherein the removing step comprises removing the protective floor film from the floor surface at a rate of at least 0.5 meters per second.

39. A method of protecting flooring comprising steps of:

providing a protective floor film comprising:

a base floor film layer; and an acrylic pressure sensitive adhesive layer disposed on the base floor film layer; wherein the an acrylic pressure sensitive adhesive comprises:

an acrylic pressure sensitive adhesive having an inherent viscosity in a range of 0.3 dl/g or greater;

a cross-linker; and 15 to 50 parts per 100 parts of acrylic pressure sensitive adhesive of a plasticizer compatible with the acrylic pressure sensitive adhesive;

wherein, the adhesive composition has a glass transition temperature of −10 degrees Celsius or less and the adhesive composition has an initial 180 degree peel adhesion test value of 5 oz/in or greater, and a haze test value of 10% or less;

laminating the protective floor film onto a floor surface at a rate of at least 0.5 meters per second; and removing the protective floor film from the floor surface to form a removed protective floor film.

40. A method according to claim 39, wherein the removing step comprises removing the protective floor film from the floor surface at a rate of at least 0.5 meters per second.

41. A method according to claim 39, wherein the removing step comprises removing the protective floor film from the floor surface at a rate of at least 0.5 meters per second, to form a removed protective floor film, wherein 5% or less of the protective floor film remains on the floor surface.

* * * * *

UNITED STATES PATENT AND TRADEMARK OFFICE

CERTIFICATE OF CORRECTION

PATENT NO. : 7,763,337 B2
APPLICATION NO. : 11/576962
DATED : July 27, 2010
INVENTOR(S) : Adriana Paiva et al.

It is certified that error appears in the above-identified patent and that said Letters Patent is hereby corrected as shown below:

On the Title Page Item (87) (PCT Pub. Date)
Line 1, Delete "Oct. 27, 2006" and insert in place thereof -- Apr. 27, 2006 --.

Column 9
Line 44-45 (Approx.), Delete "polyurethanes," and insert in place thereof -- polyurethanes --.

Column 17
Line 60 (Approx.), Delete "50%" and insert in place thereof -- ~50% --.

Signed and Sealed this
Twenty-fourth Day of April, 2012

David J. Kappos
*Director of the United States Patent and Trademark Office*